United States Patent

Kulig

[15] 3,704,623
[45] Dec. 5, 1972

[54] DRIVE FOR A CONTAINER PROCESSING MACHINE

[72] Inventor: Constantine W. Kulig, Windsor, Conn.

[73] Assignee: Emhart Corporation, Bloomfield, Conn.

[22] Filed: July 22, 1971

[21] Appl. No.: 164,989

[52] U.S. Cl. .............................. 73/37, 73/45, 74/86
[51] Int. Cl. ................................................ G01n 3/10
[58] Field of Search............ 73/37, 41, 45, 45.1, 45.2; 141/137, 191; 74/86

[56] References Cited

UNITED STATES PATENTS

| | | | |
|---|---|---|---|
| 2,314,310 | 3/1943 | Jackson et al. | 73/41 |
| 3,010,310 | 11/1961 | Rowe et al. | 73/45 |
| 3,496,761 | 2/1970 | Powers | 73/45.2 |

*Primary Examiner*—S. Clement Swisher
*Attorney*—Roger B. McCormick et al.

[57] ABSTRACT

A drive for moving a container processing apparatus at a substantially uniform speed with a line of containers advancing on a conveyor is disclosed in a machine wherein glass bottles are to be pressure tested and the processing apparatus comprises at least one pressure testing head. The pressure testing heads are cyclically swept along a segment of a moving conveyor on which the bottles to be tested are carried and, in order to substantially synchronize the speed of the pressure testing head with the uniform speed of the bottles on the conveyor, the pressure testing head is mounted on the orbiting link of a parallel crank, four bar linkage which is rotated by means of a rotational drive mechanism having an elliptical gear set. The gear set provides a variable drive ratio and, when driven by means of a constant speed motor, modulates the speed of the orbiting link and the pressure heads so that the heads sweep into engagement and accurately track the bottles during the pressure testing portion of the orbit. The elliptical gears also cause the pressure heads to travel along the return portion of the orbit at a more rapid speed in preparation for the next pressure testing cycle.

24 Claims, 8 Drawing Figures

PATENTED DEC 5 1972 3,704,623

DRIVE FOR A CONTAINER PROCESSING MACHINE

BACKGROUND OF THE INVENTION

The present invention relates to a mechanism for tracking articles which move at a substantially uniform speed along a conveying device. More particularly, the invention resides in a drive mechanism which causes a container processing apparatus to sweep into close proximity to a container on a conveyor and accurately track the container with negligible relative movement along a short segment of the conveying device.

In many types of container processing machines, conveying devices are utilized to translate containers serially through various manufacturing operations such as filling, cleaning, inspecting, or other operations where each container must be accurately tracked with negligible relative movement between the container and a tracking head carrying a member which operates upon the containers. Generally, the conveying devices move the containers at uniform speed in order to reduce inertial loads and to avoid disturbing the containers themselves. Stopping, starting or changing the speed of the conveying device are not desired and, as a consequence, it is preferred that operations be carried out while the conveyor is in motion. If the process can be carried out in this fashion, there is less likelihood of disturbing the containers and less likelihood of interfering with other operations carried out at other stages or positions along the conveying device.

The simple harmonic motion of a tracking head produced by a crank orbiting the head at constant rotational speed may be quite satisfactory for certain operations where tracking accuracy is not important. A machine which functions in this manner is shown in U.S. Pat. No. 2,768,656. Where more accurate tracking is required, the orbiting speed may be modulated for precise tracking by a special, cam-operated driving mechanism such as shown in U.S. Pat. Nos. 3,387,704 or 3,489,275. It has been found in accordance with the present invention that an improved tracking apparatus having the simplicity of form of the machine producing simple harmonic motion can also provide the tracking accuracy of the cam-operated driving mechanism.

Accordingly, it is a general object of the present invention to provide apparatus for accurately tracking articles such as glass containers moving at a substantially uniform speed along a conveying device.

SUMMARY OF THE INVENTION

The present invention resides in a drive for a glass container processing apparatus for moving the apparatus with one or more containers advancing on a conveyor at a constant or substantially uniform speed. The apparatus comprises a glass bottle pressure testing head which is mounted to rotating means for cyclically translating the head along a portion of the conveyor on which the bottles move and in the direction of motion of the bottles. The rotating means in one form is a parallel-crank, four-bar linkage, and motor means providing a constant drive speed, is connected to the rotating means for driving it and orbiting the pressure testing head.

A drive train interposed between the motor means and rotating means is provided with a variable ratio gear set so that the orbital speed of the tracking member is modulated to closely approximate that of a bottle moving at a uniform speed on the conveyor. In a preferred form of the invention, the gear set is comprised of elliptical gears which have a cyclically varying gear ratio and provide a relatively slow and substantially uniform speed while the testing head is used on a bottle, and a fast return speed during each cycle of operation. The elliptical gear set substantially synchronizes the speed of the testing head with the uniform speed of a bottle on a conveyor.

DESCRIPTION OF THE PREFERRED EMBODIMENTS

Figure 1:
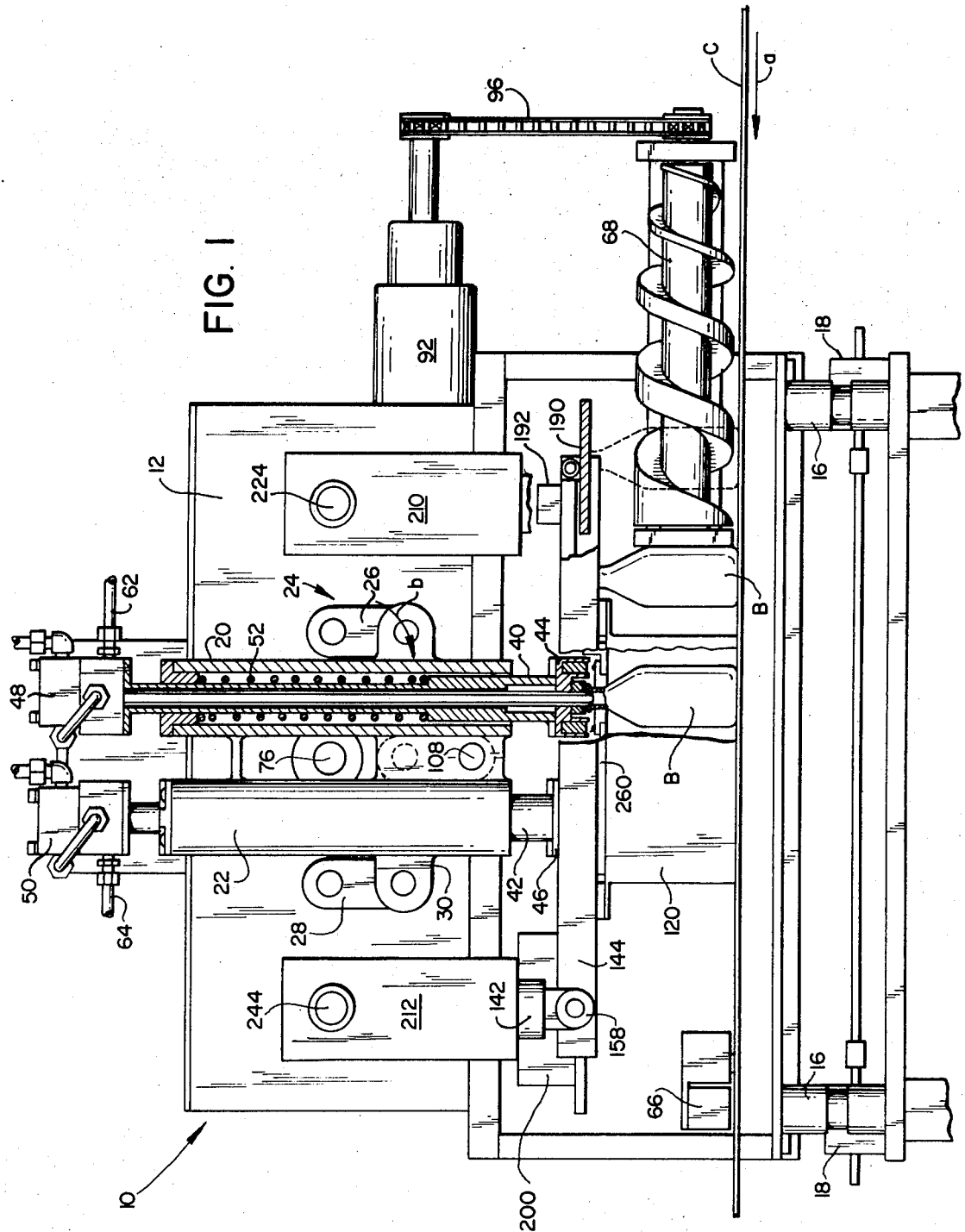
FIG. 1 is a front elevation view of a pressure testing apparatus embodying the present invention and cooperating with a conveyor carrying glass bottles.
Figure 2:
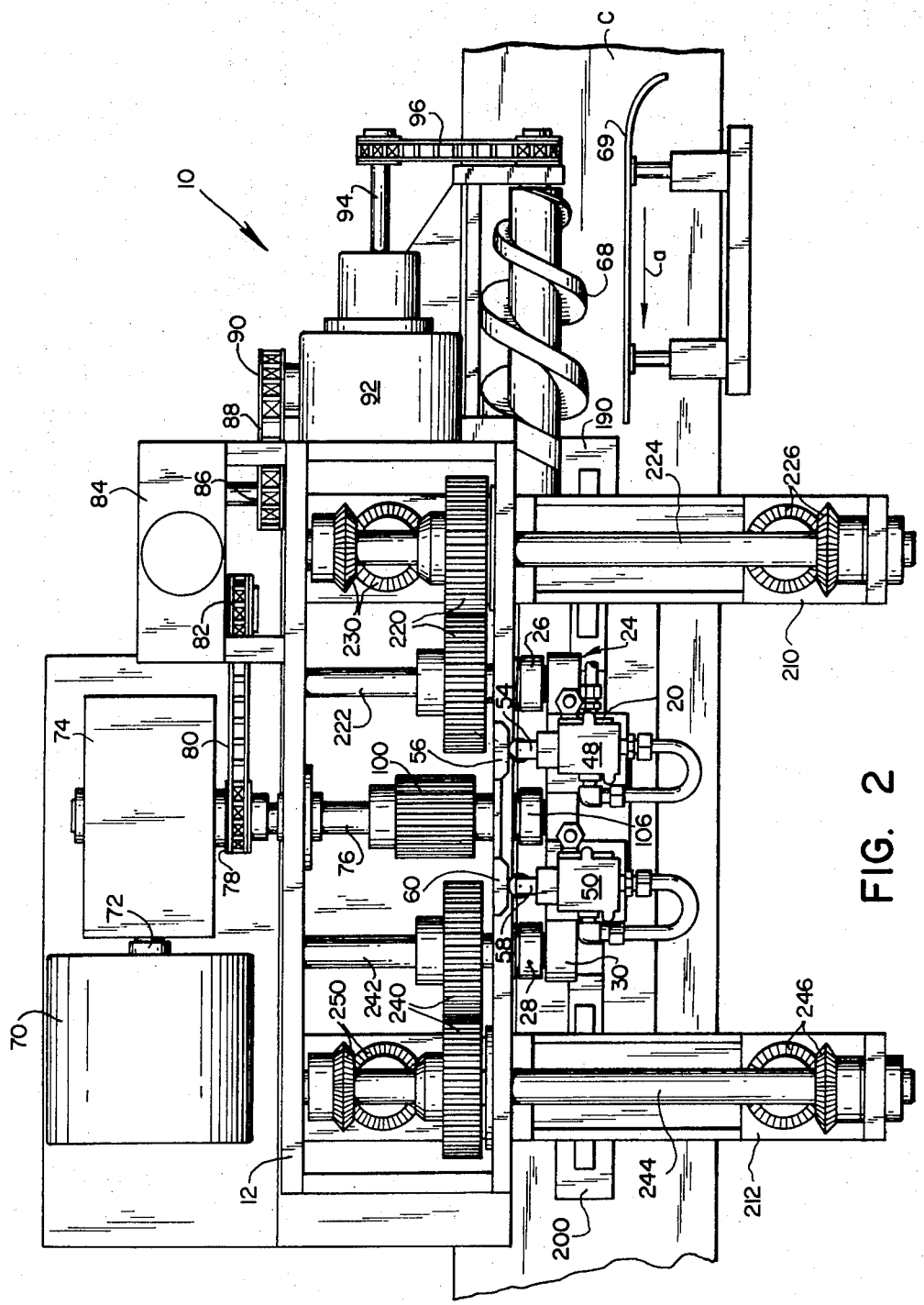
FIG. 2 is a top plan view of the pressure testing apparatus shown in FIG. 1.
Figure 3:
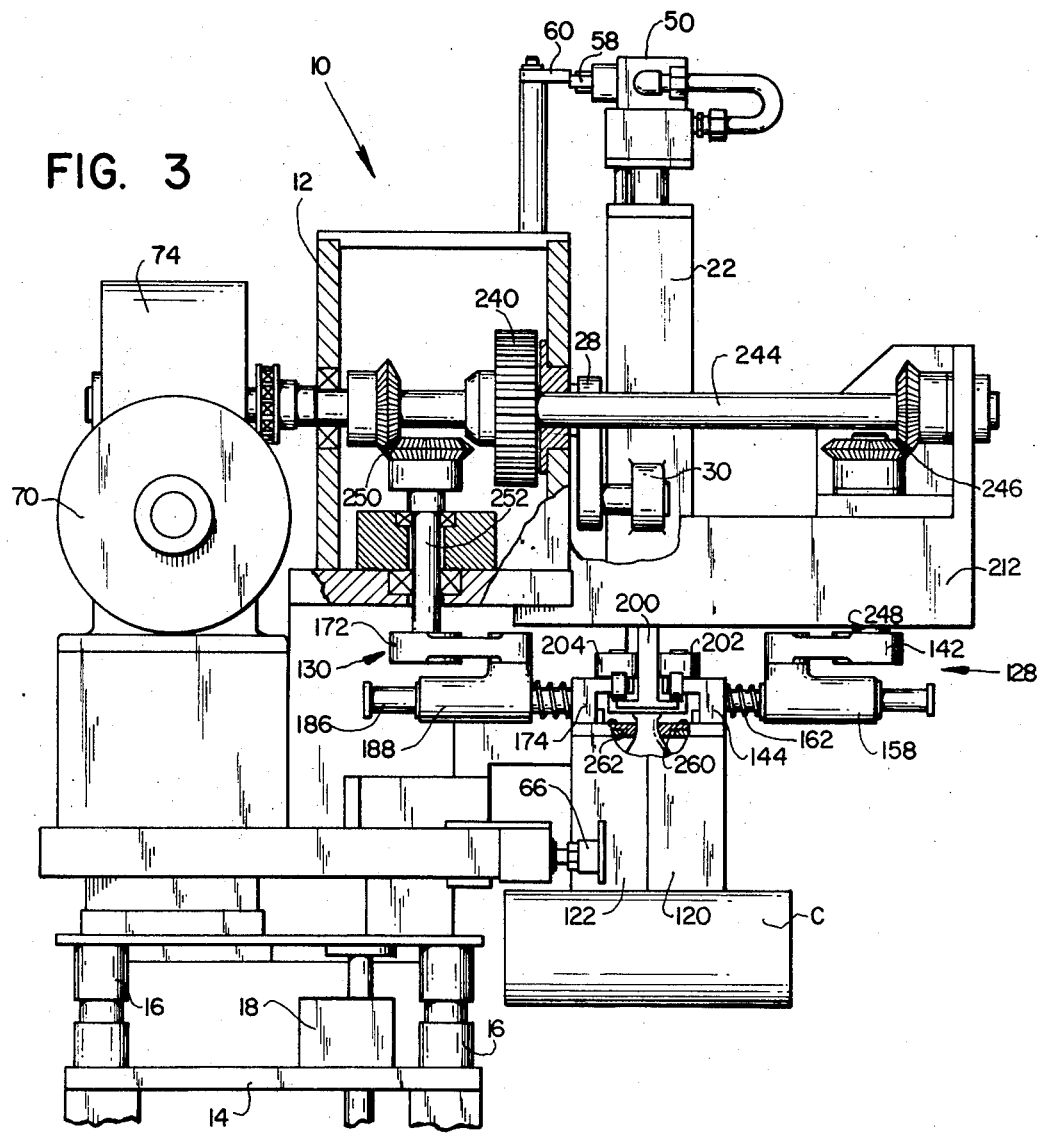
FIG. 3 is a side elevation view of the pressure testing apparatus shown in FIG. 1.

FIGS. 1, 2, and 3 show a pressure testing apparatus which embodies the present invention and which comprises a machine, generally designated 10, for inspecting glass bottles B translated serially along a belt-type conveyor C. The conveyor C advances the empty bottles B at a substantially constant or uniform speed to prevent the bottles from falling over or being damaged. The direction of motion of the conveyor C and the bottles B is from right to left in FIGS. 1 and 2 as indicated by arrows a.

The pressure testing machine 10 is an inspection machine which tests the glass bottles B for adequate strength and soundness. During the testing cycle, the machine pressurizes the bottles by filling the bottles with a pressurized fluid, such as compressed air, to a preselected pressure level. The pressure level is selected so that the bottles having adequate strength will not fail by bursting during the test. Weak bottles are destroyed and the fragments are removed by an ejecting device. The apparatus also checks the bottles for form or soundness. If a hole exists in a bottle or if the mouth or "finish" of a bottld is so dhstorted that an inadequate seal is formed with the pressure head, leakage of the compressed gas prevents the selected pressure level from being reached. Such bottles are also removed from the conveyor C by the ejecting device which removes the fragments of a burst bottle.

The pressure testing machine 10 has a structural support frame 12 from which the drive mechanisms and pressure testing devices are supported. The frame 12 is in turn supported from the floor adjacent the conveyor C by means of a table 14. Interposed between the table 14 and the frame 12 are a set of leveling jacks 16 and associated leveling mechanism 18 which permit the frame 12 to be elevated and precisely leveled over the conveyor C.

The pressure testing devices shown most clearly in FIG. 1 include a pair of cylinder assemblies 20 and 22 which are supported generally perpendicular to the conveyor C by a parallel-crank, four-bar linkage 24. The four-bar linkage 24 includes two idler cranks 26 and 28 of equal length and an orbiting link 30 extending between the ends of the cranks in generally parallel relationship to the conveyor C. The orbiting link 30 is an integral part of the cylinder assemblies 20 and 22. As the parallel cranks rotate and orbit the link 30, the link remains parallel with the conveyor C at each point on the orbit and correspondingly maintains the cylinder assemblies 20 and 22 perpendicular to the conveyor C. Each of the cylinder assemblies 20 and 22 has a pressure probe 40 or 42 and a pressure head 44 or 46 at the depending end of the probe which engages and tracks a bottle B during a test cycle. A fluid control valve 48 or 50 is mounted to the upper end of the probe for delivering pressurized fluid from a fluid pressure source (not shown) to the probes and bottles.

Both of the cylinder assemblies 20 and 22 have the same internal construction shown in the sectioned portion of assembly 20. A biasing spring 52 urges the pressure probe 40 downwardly toward the bottles and the conveyor C, until the upper end of the probe contacts the upper end of the cylinder assembly. With the spring 52 biasing the probe 40 downwardly, the orbiting motion of link 30 and the assemblies 20 and 22, which is generated by a rotational drive means described in greater detail below, causes the pressure heads 44 and 46 to engage the bottles moving under the assemblies 20 and 22 on the conveyor C. The compliance of the pressure probe 40 provided by the spring 52 allows the pressure head 44 to sweep onto the mouth of the bottle B and then translate horizontally with the bottle along a testing segment of the conveyor C before being lifted from the bottle as the housing of the assembly 20 follows a circular arc corresponding to the portion of the orbital path closest to the conveyor and indicated by the arrow b.

When the pressure heads 44 and 46 have engaged the bottles, the control valves 48 and 50 are mechanically actuated to pressurize the probes and bottles. For this purpose, the valve 48 has a cam follower wheel 54 which contacts an actuating cam 56 shown in FIG. 2 mounted on the frame 12 and the valve 50 has a cam follower wheel 58 which contacts an actuating cam 60 mounted on the frame 12 adjacent cam 56. The cams and cam follower wheels are positioned relative to one another so that the valves 48 and 50 open after the pressure head 44 and 46 have made contact with the bottles and close before the pressure heads are disengaged from the bottles. If a bottle does not appear under one of the heads, the corresponding probe and valve drop below the actuating cam, which is best understood by reference to the positioning of the follower wheel 58 and the cam 60 in FIG. 3, and no pressurized fluid is transmitted to the pressure head.

The pressure lines 62 and 64 lead to pressure switches which sense the pressure in each of the bottles under test. If one of the bottles should fail or be malformed such that the pressure in the probe does not reach the selected value at which the pressure switch is set, a bottle ejector 66 is actuated after an appropriate time delay, depending upon the speed of the conveyor and the probe involved, to either clean the fragments of the bottle off of the conveyor C or eject the malformed bottle.

A feed worm 68 extending longitudinally along the conveyor C is provided with convolutions which engage the bottles and shift the bottles along the conveyor C in conjunction with a resiliently biased feed rail 69 (FIG. 2) in order to locate the bottles on the conveyor in phased relationship with the orbital motions of the link 30 and pressure heads 44 and 46 and also to space the bottles from each other by a distance equal to the separation between the pressure heads 44 and 46. In other words, the feed worm 68 discharges bottles from its longitudinal end closest to the pressure heads 44 and 46 at a time which is determined calculated according to the velocity of the conveyor C to bring the mouth of the bottle into mating relationship with one of the orbiting pressure heads.

The drive mechanism which operates both the four-bar linkage 24 and the feed worm 68 is best shown in the plan view of the pressure testing machine 10 shown in FIG. 2. The principal power source for the machine is the constant speed drive motor 70 mounted at the rear side of the frame 12. The drive motor 70 may be a D. C. motor which can be adjusted to set the basic speeds of the pressure heads 44 and 46 and the worm 68 to match the constant speeds of many different conveyors. Power is transmitted from the output shaft 72 of the motor 70 to a 90° gear box 74 having a drive shaft 76. The drive shaft 76 extends transversely through the frame 12 and is journaled at both the front and rear sides of the frame. A drive sprocket 78 is fixed to the drive shaft 76 adjacent the gear box 74 and is coupled by a drive chain 80 to the input sprocket 82 of a mechanical phase adjustor 84. The phase adjustor 84 has an output sprocket 86 and permits the phase or rotational positions of the output sprocket 86 and mechanism connected to the output sprocket to be adjusted with respect to the phase or rotational position of the input sprocket 82 and mechanism connected with the input sprocket. The sprocket 86 is coupled by a drive chain 88 to the input sprocket 90 of a 90° gear box 92. The output shaft 94 of gear box 92 is coupled by a drive chain 96 to the feed worm 68 which positions the bottles on the conveyor C in phased relationship with the pressure heads 44 and 46 (FIG. 1). Adjustment of the phase adjustor 84 allows the proper phase relationship to be set between the worm 68 and the other driven components of the pressure testing apparatus, particularly the four-bar linkage 24, to bring the bottles into engagement with the pressure heads.

Figure 4:
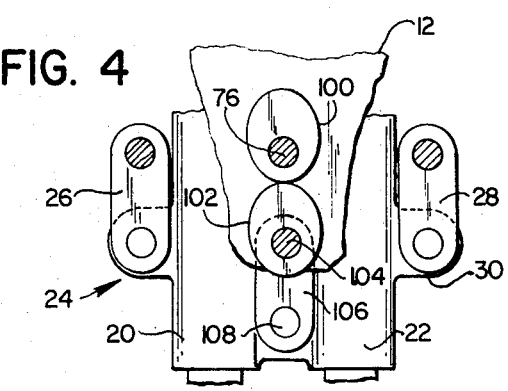
FIG. 4 is a fragmentary rear view showing the phasing of the parallel crank, four-bar linkage and the elliptical gear set which orbits the pressure testing heads in the apparatus of FIG. 1.
Figure 7:
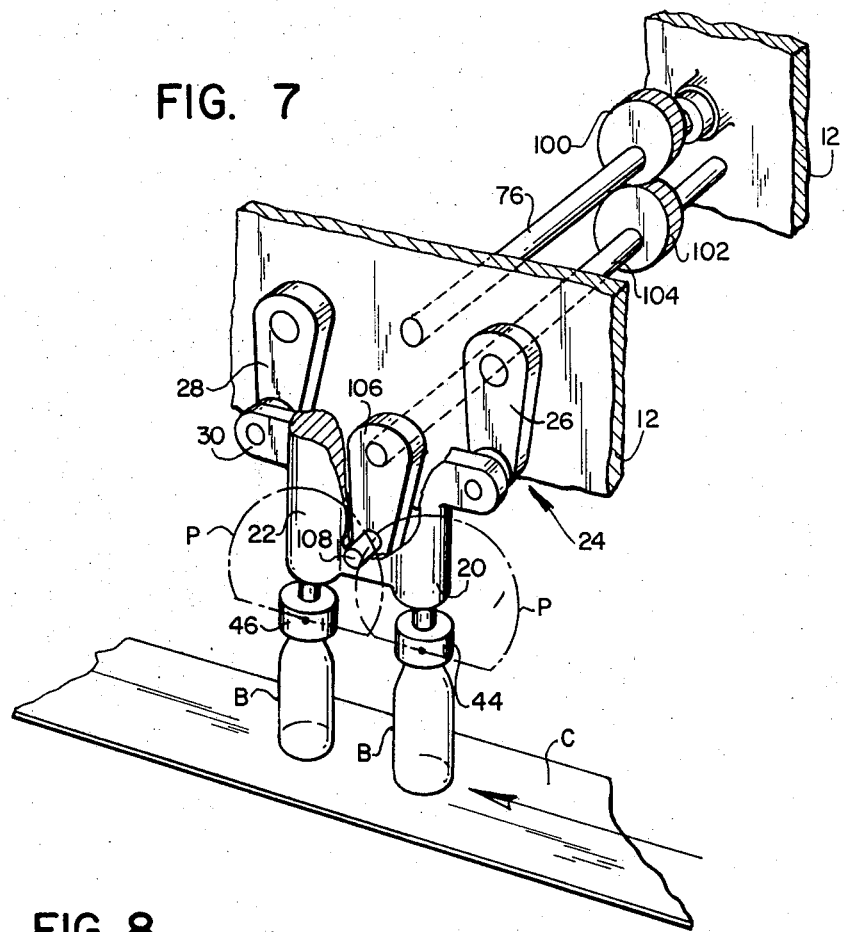
FIG. 7 is a fragmentary perspective view of the parallel-crank, four-bar linkage and the elliptical gear set which orbit the pressure testing heads over the bottles and conveyor.

As shown in FIGS. 2, 4, and 7, the drive shaft 76 rotates a set of elliptical gears 100 and 102 located within the support frame 12. The gear 100 mounted on drive shaft 76 drives the gear 102 which is mounted on a driven shaft 104 journaled in the frame 12. A drive crank 106 is fixedly secured to the driven shaft 104 adjacent the four-bar linkage 24 and has a crank pin 108 which engages the orbiting link 30 between the cylinder assemblies 20 and 22. The elliptical gears 100 and 102 are the same size and therefore rotate the crank 106 through one revolution for each revolution of the shaft 76. The length of the crank 106 is equal to the length of the cranks 26 and 28 so that one rotation of the crank 106 produces corresponding rotations of cranks 26 and 28 and translates the link 30 through a single orbit.

All elliptical gears have cyclically variable gear ratios and therefore rotation of gear 100 at constant speed proportional to that of motor 70 produces a variable rotational speed of the gear 102 and driving crank 106 and a variable orbital speed of the link 30 in the four-bar linkage 24. The phasing of the gears 100 and 102 and the orbital position of the link 30 is indicated in FIG. 4. The driving crank 106, the idler cranks 26 and 28 and the orbital link 30 are at the low point of the orbit when the gears 100 and 102 produce the slowest rotational speed of gear 102 and therefore the slowest orbital speed of link 30. When the gears are rotated 180° from the position shown in FIG. 4, the cranks 106, 26 and 28 and the link 30 are located at the highest point of the orbit and move at the highest speed. From this geometry, it is clear that the pressure heads 44 and 46 mounted on the link 30 move onto and travel with the bottles at slow speed and return to the starting position for a subsequent test cycle at high speed. The elliptical gears, therefore, have one advantage in that they provide a slow speed for the pressure heads to impact with the bottles and carry out the pressure tests and provide a high speed for returning the pressure heads along the orbits to the starting positions for subsequent pressure tests.

Figure 5:
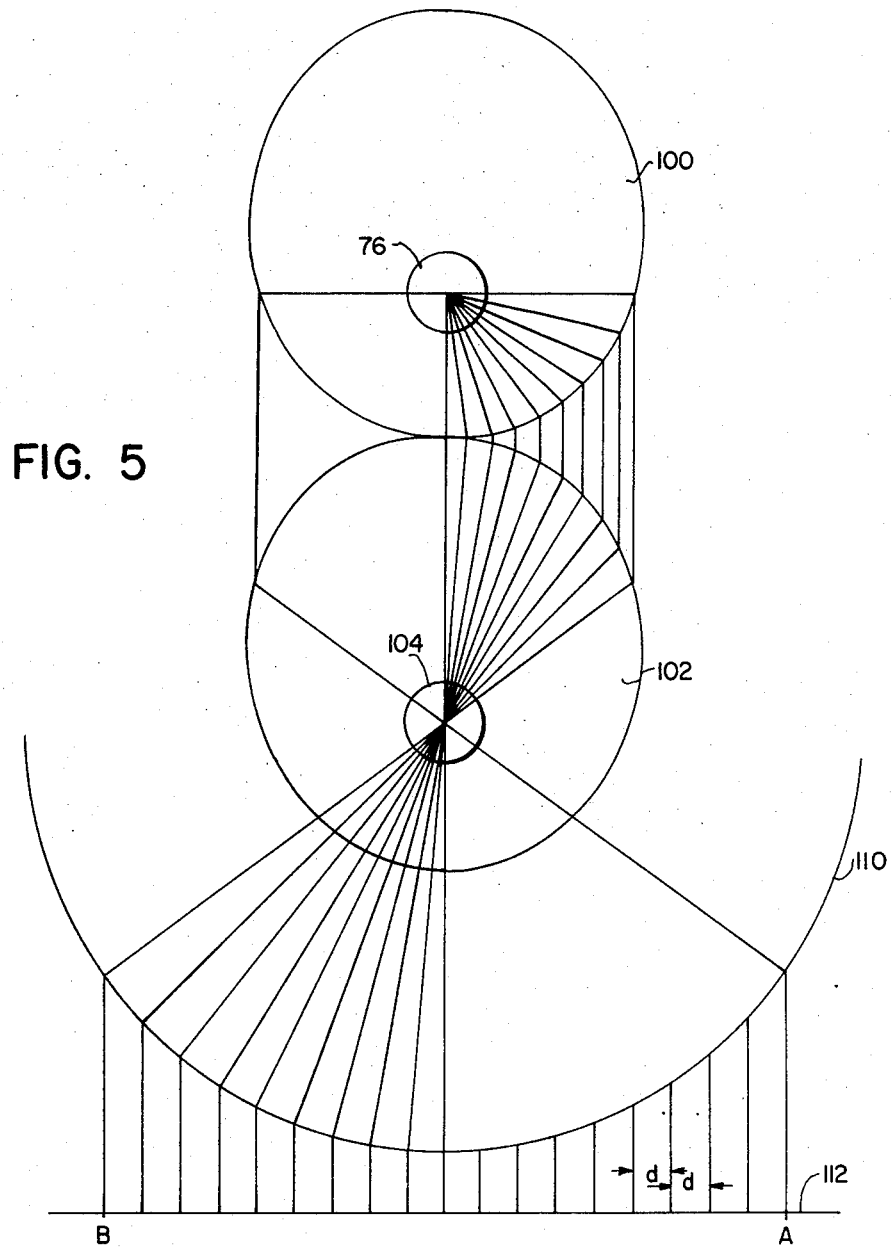
FIG. 5 is a diagram showing the output displacements produced by the elliptical gear set and the parallel-crank, four-bar linkage.

Another advantage obtained from the elliptical gears utilizes the variable gear ratio to cause a more accurate tracking of the bottle by the pressure head while the head is engaged with the bottle than would otherwise be possible with conventional gears. FIG. 5 shows a diagram of the incremental displacements $d$ of a pressure head during equal increments of time as the pressure head moves along the linear tracking segment of the dotted path P shown in FIG. 7. The graduations on gear 100 represent angular displacements of the gear 100 at constant speed for equal increments of time. The corresponding angular displacements of the gear 102 and driving crank 106 are indicated by the graduations projecting from the gear 102 to the circular arc 110 having the radius of crank 106. The corresponding incremental displacements of the pressure head are shown by the projections from the arc 110 onto the line 112 between the point of initial contact A and the point of departure B.

Figure 6:
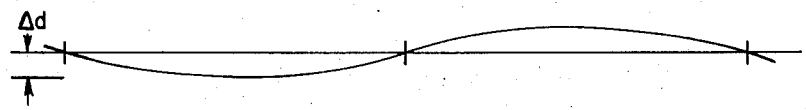
FIG. 6 is a plot showing the deviation of the displacements produced by the elliptical gear set and the displacements of an article moving at uniform speed.

While the displacements $d$ appear to be equal, FIG. 6 shows that a slight deviation $\Delta d$ exists between the displacement of the pressure head and the displacement of the bottle moving at a constant speed on the conveyor. In one embodiment of the invention with the distance between point A and point B of FIG. 5 equal to 4.75 inches, the maximum value of $\Delta d$ shown in FIG. 6 is less than 0.02 inches. Therefore, the deviation of the pressure head motions from a constant speed is so small that the pressure testing operation is not adversely affected. Furthermore, it is noted that the actual positions of the pressure head and bottle coincide at three points along the segment of the conveyor over which the testing operation is performed. Since there is actual coincidence at three points and the deviation is very small at other points within the test segment, the elliptical gears substantially synchronize the velocities of the heads and bottles during the pressure test.

It is desirable to have the bottles enveloped in a protective shield as the bottles pass under the cylinder assemblies 20 and 22 in the event that a pressure test should result in the bursting of a weak bottle. For this purpose, a shield composed of two shells 120 and 122 in FIG. 3 closes around the bottles and tracks the bottles in the same manner as the pressure heads while the pressure tests are conducted. The shell 120 is suspended from a parallel crank, four-bar linkage 128 at one lateral side of the conveyor C and the shell 122 is suspended at the other lateral side of the conveyor C from another parallel crank four-bar linkage 130 laterally opposed to the linkage 128.

Figure 8:
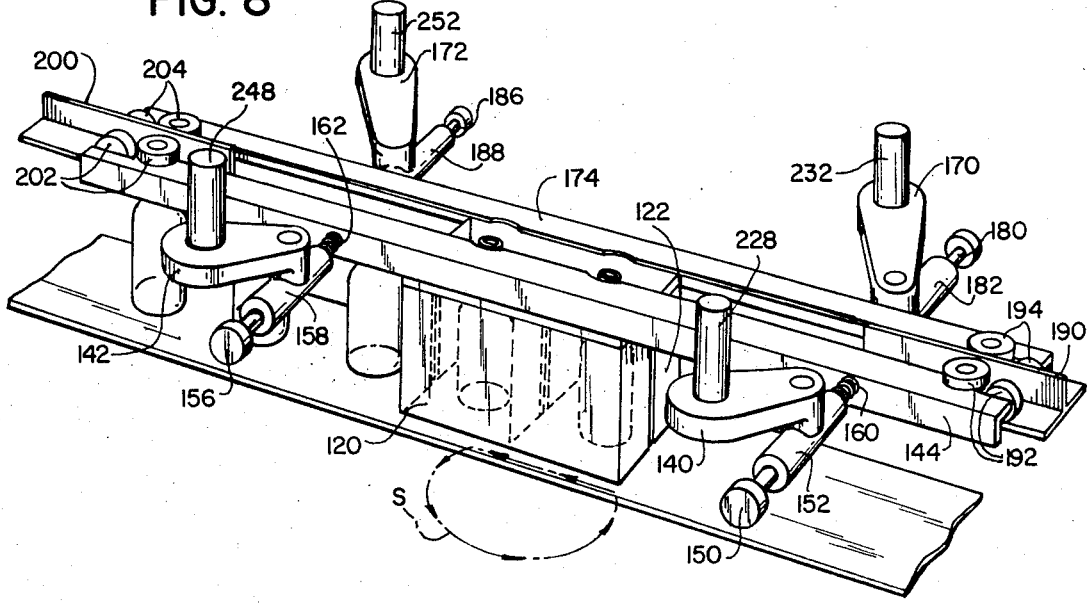
FIG. 8 is a fragmentary perspective view of the actuating mechanism and shield which encloses the bottles during the pressure testing cycles.

As seen in FIG. 8, four-bar linkage 128 is composed of two parallel cranks 140 and 142 and the orbiting link 144 which is connected to crank 140 by means of a slide rod 150 and pivoted sleeve 152 and to crank 142 by means of a slide rod 156 and a pivoted sleeve 158. Springs 160 and 162 are interposed between the orbiting link 144 and the sleeves 152 and 158 respectively. The shell 120 is connected to the midpoint of the orbiting link 144 which is parallel to the conveyor and consequently the shell is translated over the conveyor C as the parallel cranks 140 and 142 rotate.

The four-bar linkage 130 is constructed in the same manner as the linkage 128. A pair of parallel cranks 170 and 172 are connected to an orbiting link 174 by means of a slide rod 180 and a sleeve 182 pivotally connected to crank 170 and a slide rod 186 and sleeve 188 pivotally connected to crank 172. Springs (one seen in FIG. 3.) corresponding to springs 160 and 162 are interposed between the orbiting link 174 and the sleeves 182 and 188. The shell 122 is connected to the midpoint of the orbiting link 174 which is parallel to the conveyor and consequently the shell is translated over the conveyor C as the parallel cranks 170 and 172 rotate.

As shown in FIGS. 1, 3 and 8, a T-shaped rail 190 is suspended from one end of the frame 12 over the conveyor C and is contacted by guide wheels 192 and 194 mounted at one end of the orbiting links 144 and 174 respectively. At the opposite end of the frame 12 another T-shaped rail 200 is suspended over the conveyor C and is engaged by guide rollers 202 and 204 on the orbiting links 144 and 174 respectively. The rails 190 and 200 serve as guides for the orbiting links 144 and 174 and the shells 120 and 122 so that the shells close around the bottles at a central location over the conveyor. The shells remain tightly closed during the pressure test due to the resilient forces applied by the springs on the slide rods. The dotted path S shown in FIG. 8 indicates the trace followed by a point on the shell 120 as it is orbited by the link 144. A corresponding path at the opposite side of the conveyor is followed by the shell 122.

The four-bar linkage 128 is suspended adjacent the one lateral side of the conveyor C by means of two cantilevered beams 210 and 212 forming part of the frame 12. The four-bar linkage 130 is suspended from the frame 12 at the opposite side of the conveyor C. The cranks 140 and 170 are coupled together for rotation in synchronism with one another by means of the crank 26, a conventional gear set 220 (in FIG. 2) driven by the crank 26 through shaft 222, and a common drive shaft 224. A bevel gear set 226 connected to shaft 224 drives the shaft 228 (in FIG. 8) to which crank 140 is secured and a bevel gear set 230 drives the shaft 232 to which the crank 170 is connected.

In a similar manner, cranks 142 and 172 are coupled for rotation in synchronism with each other and with cranks 140 and 170 by crank 28, the conventional gear set 240 driven through shaft 242 by the crank 28, and a common drive shaft 244. A bevel gear set 246 driven by shaft 244 rotates shaft 248 on which the crank 142 is mounted and a bevel gear set 250 rotates shaft 252 on which the crank 172 is mounted.

It should be understood that the cranks 26, 28 are driven through the elliptical gears 100 and 102 so that the orbital velocities of the cranks are modulated as described above. All of the gearing and drive shafts interconnecting the cranks 26 and 28 with the cranks 140, 142, 170 and 172 provide a drive ratio of 1:1 so that the orbiting motions of the links 144 and 174, and correspondingly shells 120 and 122, have the same modulated velocities as the orbiting link 30 and the pressure heads 44 and 46. In addition, all of the cranks of the four-bar linkages 24, 128 and 130 are phased with each other and with the motions of the bottles under the pressure heads and, therefore, the shells 120 and 122 close around the bottles as the pressure heads sweep downwardly onto the mouths of the bottles.

As seen in FIG. 3, the upper portion of the shells 120 and 122 may include clamping members 260 and 262 respectively which engage the necks of the bottles. The members 260 and 262 are formed as removable inserts in the shells 120 and 122 respectively so that different inserts can be installed for bottles of different sizes and shapes. The clamping members 260 and 262 are not essential since the feed worm 68 positions the bottles on the conveyor in substantially the correct position for engagement with the pressure heads and the modulated orbital speed of the pressure head closely approximates the linear speed of the bottles and conveyor during a pressure test. However, the clamping members 260 and 262, if engaged with the lip of the bottle, can carry the downward forces of the pressure heads and the pressurized gas and prevent such forces from being carried by the conveyor. Additionally, the clamping members insure that the bottles are precisely centered under the pressure heads and that the bottles move with precisely the same velocity profile as that of the pressure heads since the shells 120 and 122 have the same modulated orbital velocity as the pressure heads. The slight deviation between the velocities of the clamping members 260 and 262 and the conveyor is not significant and is basically the same as that described with respect to FIG. 6.

While the present invention has been described in a preferred embodiment, it should be understood that numerous modifications and substitutions can be had without departing from the spirit of the invention. For example, although dual pressure heads have been shown connected to the orbiting link 30, it will be readily understood that a single pressure head or more than two pressure heads could be employed. In many applications of the apparatus, the shells 120 and 122 and the four-bar linkages 128 and 130 may be eliminated. Furthermore, the drive mechanism can be utilized for many other inspection purposes or for any type of operation in which a tracking member must be brought into substantially synchronous speed with articles traveling at uniform speed along a conveying device. Accordingly, the present invention has been described in a preferred embodiment by way of illustration rather than limitation.

I claim

1. A drive for moving a container processing apparatus along with a container advancing on a conveyor at constant speed and comprising a driven rotating means connected to the processing apparatus for cyclically translating the apparatus along a portion of the conveyor in the direction of movement of the conveyor and container, a drive motor for the rotating means, and a drive train interposed between the motor and rotating means including a variable ratio gear set adapted to substantially match the speed of the processing apparatus with the speed of the container during that portion of the cycle wherein the apparatus is moved in the direction of the conveyor.

2. A drive for moving a container processing apparatus as defined in claim 1 wherein the variable ratio gear set comprises a set of elliptical gears.

3. A drive for moving a container processing apparatus as defined in claim 1 wherein the driven rotating means translates the processing apparatus along a closed path having a tracking segment extending generally along said portion of the conveyor and a return segment located away from the conveyor relative to the tracking segment; and the variable ratio gear set has a cyclically variable ratio and is phased with the driven rotating means to provide faster translation of the processing apparatus along the return segment than along the tracking segment.

4. A drive for moving a container processing apparatus as defined in claim 1 wherein the driven rotating means comprises a parallel-crank four-bar linkage, the movable link connected between the parallel cranks being positioned parallel to the conveyor and supporting the processing apparatus and the parallel cranks being connected to and rotated by the drive train including the variable ratio gear set.

5. A drive for moving a container processing apparatus as defined in claim 4 wherein a resiliently slidable mounting means is interposed between the movable link of the four-bar linkage and the container processing apparatus.

6. A drive for moving a container processing apparatus as defined in claim 5 wherein the resiliently slidable mounting means comprises two sliding connectors pivotally mounted to the two parallel cranks respectively and the movable link is connected to the parallel cranks by the two sliding connectors.

7. A drive for moving a container processing apparatus as defined in claim 6 wherein the two sliding connectors include resilient members interposed between the movable link and the cranks to permit the movable link to slide resiliently relative to the cranks.

8. A drive for substantially synchronizing the speed of a container processing apparatus momentarily with a container being tracked and moving along a straight path at a constant speed comprising: orbital means supporting the processing apparatus for sweeping the processing apparatus along a segment of the path; and drive means connected to the orbital means for driving the orbital means and the processing apparatus along the segment of the path at a speed substantially synchronized with the article, the drive means including a driving shaft, a driven shaft connected to the orbital means, and a set of elliptical gears coupling the driving shaft to the driven shaft.

9. In a container processing machine which momentarily tracks each of a plurality of containers moving serially along a line of motion past the processing machine on a conveying device at a uniform speed, the improvement comprising: a supporting frame; a first rotatable member mounted to the frame and having an axis of rotation parallel to a line perpendicular to the line of motion of the containers past the processing machine on the conveying device; a tracking head suspended from and orbited by the first rotatable member, the orbit of the tracking head having one portion sweeping the tracking head adjacent a segment of the line of motion past the processing machine; and rotational drive means connected to the first rotational member for rotating the first member and sweeping the tracking head along the one portion of the orbit in the direction of motion of the containers on the conveying device, the rotational drive means including a drive shaft, a driven shaft and a gear set having a cyclically variable gear ratio interposed between the drive shaft and the driven shaft, the driven shaft being connected to rotate the first rotatable member whereby the tracking head is cyclically swept along the one portion of the orbit.

10. The improvement as defined in claim 9 wherein the tracking head comprises a container engaging member.

11. The improvement as defined in claim 9 wherein the tracking head comprises a pressure testing head engageable with the containers.

12. The improvement as defined in claim 9 wherein the tracking head comprises a container enclosure member.

13. The improvement as defined in claim 9 further including positioning means connected with the supporting frame and overlying a part of the line of motion past the machine in advance of said segment to position the articles for registration with the tracking head as the head sweeps adjacent said segment.

14. The improvement as defined in claim 13 wherein the positioning means comprises a rotatable feed worm and means for driving the feed worm synchronously with the drive shaft of the rotational drive means.

15. The improvement as defined in claim 9 including a first parallel-crank, four-bar linkage mounted to the support frame, the first rotatable member being one of the parallel cranks, the orbiting link interconnecting the parallel cranks of the first four-bar linkage being located in parallel relationship with said segment of the line of motion of the containers past the machine and providing a mount for the tracking head.

16. The improvement as defined in claim 15 wherein: second and third parallel-crank four-bar linkages are mounted to the support frame at opposite sides of the line of motion, respectively, and in opposed relationship, the orbiting links of the second and third linkages being located parallel to said segment of the line of motion; coupling means connect each of the parallel cranks of the second and third four-bar linkages to the rotational drive means for driving the second and third four-bar linkages in synchronism with the first four-bar linkage; and mating engaging members are mounted to the orbiting links of the second and third four-bar linkages.

17. The improvement as defined in claim 16 wherein the mating engaging members are shielding members.

18. The improvement as defined in claim 15 wherein the tracking head comprises a pressurizing head resiliently mounted to the orbiting link of the first four-bar linkage.

19. Apparatus for pressure testing bottles moving along a conveyor at uniform speed comprising: a first parallel-crank, four-bar linkage having an orbiting link connected between the parallel cranks; means for supporting the four-bar linkage adjacent the conveyor with the orbiting link generally parallel to the direction of motion of the bottles; drive means connected to rotate the parallel cranks of the four-bar linkage and move the orbiting link cyclically through a complete orbit and in the direction of motion of the bottles at one portion of the orbit closest to the conveyor, the drive means having elliptical gearing modulating the motion of the orbiting link of the four-bar linkage through each orbit; and pressurizing means mounted to the orbiting link of the four-bar linkage for movement with the orbiting link.

20. Apparatus for pressure testing as defined in claim 19 wherein the pressurizing means comprises a pressure probe resiliently mounted to the orbiting link and having a pressure head engageable with the bottles along said one portion of the orbit closest to the conveyor, and a pressurizing valve connected to the probe; and means are provided for actuating the pressurizing valve to deliver a pressurized fluid to the probe and pressure head while the head is engaged with a bottle.

21. Apparatus for pressure testing as defined in claim 20 wherein the means for actuating comprises a cam mounted to the means for supporting the four-bar linkage and a cam follower mounted on the pressure probe and translated into engagement with the cam by the movement of the orbiting link within said one portion of the orbit closest to the conveyor and by the engagement of the pressure head with a bottle.

22. Apparatus for pressure testing as defined in claim 19 further including a second parallel-crank, four-bar linkage mounted to the means for supporting and having an orbiting link connected to the parallel cranks, the second four-bar linkage being mounted with the orbiting link parallel to the direction of motion of the bottles; means connected between the drive means and the second four-bar linkage for modulating the motion of the orbiting link of the second four-bar linkage in synchronism with the motion of the orbiting link in the first four-bar linkage; and a bottle enveloping shield mounted on the orbiting link of the second four-bar linkage.

23. Apparatus for pressure testing as defined in claim 19 further including means for feeding the bottles serially along the conveyor in phased relationship with the cyclic motions of the orbiting link and the pressurizing means mounted to the link.

24. Apparatus for pressure testing as defined in claim 23 wherein the means for feeding comprises a feed worm having convolutions engaging the bottles and extending longitudinally along the conveyor and means for rotating the feed worm in phased relationship with the cyclic motions of the orbiting link.

* * * * *